(12) United States Patent
Chatterji et al.

(10) Patent No.: US 6,619,399 B1
(45) Date of Patent: Sep. 16, 2003

(54) FOAMED COMPOSITIONS AND METHODS OF USE IN SUBTERRANEAN ZONES

(75) Inventors: Jiten Chatterji, Duncan, OK (US); Richard L. Middaugh, Charleston, WV (US); James E. Griffith, Loco, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/386,822

(22) Filed: Mar. 12, 2003

(51) Int. Cl.[7] ............... E21B 33/138; C04B 22/00; C04B 24/12; C04B 24/16
(52) U.S. Cl. ............... 166/293; 106/672; 106/677; 106/678; 106/820; 166/292; 166/309; 507/202; 507/269
(58) Field of Search ................ 166/292, 293, 166/309, 177.4; 405/266; 106/672, 677, 678, 682, 820; 507/102, 202, 269

(56) References Cited

U.S. PATENT DOCUMENTS

| | | | | |
|---|---|---|---|---|
| 1,717,319 A | * | 6/1929 | Rice | 264/42 |
| 1,829,714 A | * | 10/1931 | McElroy et al. | 169/15 |
| 3,301,323 A | | 12/1963 | Parsons | |
| 3,119,704 A | * | 1/1964 | Harrell et al. | 106/682 |
| 3,299,953 A | * | 1/1967 | Bernard | 166/285 |
| 3,372,040 A | * | 3/1968 | Ware | 106/18.11 |
| 3,679,445 A | * | 7/1972 | Howe | 106/646 |
| 3,758,319 A | * | 9/1973 | Ergene | 523/218 |
| 3,764,548 A | * | 10/1973 | Redmore | 210/750 |
| 3,989,534 A | * | 11/1976 | Plunguian et al. | 106/646 |
| 4,036,656 A | * | 7/1977 | Bucco et al. | 106/18.12 |
| 4,217,231 A | * | 8/1980 | King | 507/202 |
| 4,317,758 A | * | 3/1982 | Bruning | 524/202 |
| 5,588,489 A | | 12/1996 | Chatterji et al. | |
| 5,660,465 A | * | 8/1997 | Mason | 366/3 |
| 5,663,121 A | | 9/1997 | Moody | |
| 5,716,910 A | | 2/1998 | Totten et al. | |
| 5,806,594 A | * | 9/1998 | Stiles et al. | 166/293 |
| 5,851,960 A | | 12/1998 | Totten et al. | |
| 5,897,699 A | | 4/1999 | Chatterji et al. | |
| 6,063,738 A | | 5/2000 | Chatterji et al. | |
| 6,227,294 B1 | | 5/2001 | Chatterji et al. | |
| 6,336,505 B1 | * | 1/2002 | Reddy | 166/293 |
| 6,367,550 B1 | * | 4/2002 | Chatterji et al. | 166/293 |
| 6,460,632 B1 | | 10/2002 | Chatterji et al. | |
| 6,500,252 B1 | | 12/2002 | Chatterji et al. | |

OTHER PUBLICATIONS

Lebreton "Confined Space," Publication: TDG Dangerous Goods Newsletter, Spring 1996, 5 pages vol. 16, No. 1, Internet www.tc.gc.ca/en/articles/documents/confined.htm.

Cobb et al. "Method for Predicting Compressive Strength Of Foamed Cement Under Temperature and Pressure," Apr. 15, 2002, 5 pages, Oil & Gas Journal, Internet www.cement-ingsolutions.com.

Crook et al. "Fully engineered foam–cementing process improves zonal isolation," Jul., Aug. 1999, 26–28, Drilling Contractor.

Jones et al. "Prevention of Gas Explosions by Controlling Oxygen Concentration," Apr. 25, 1935, 1344–1346, vol. 27, No. 11, Industrial and Engineering Chemistry.

Walket et al. "Effects of Oxygen on Fracturing Fluids," 1995, 339–348, SPE 28978, Society of Petroleum Engineers Inc.

Cooper et al. Effects of Temperature and Pressure on the Upper Explosive Limit of Methane–Oxygen.

* cited by examiner

Primary Examiner—George Suchfield
(74) Attorney, Agent, or Firm—Craig W. Roddy; William D. Hall

(57) ABSTRACT

The current invention provides improved methods and compositions for completing a well bore. In one aspect, the current invention provides a process for preparing a foamed cement composition. The process utilizes air to foam the cement after the air has been treated to lower the oxygen content below that concentration necessary to support combustion. Additionally, the current invention provides a process for completing a well bore using foamed cement wherein the foam is generated with reduced oxygen content air. Finally, the current invention provides a foamed cement composition wherein the gaseous portion of the composition is air having a reduced oxygen content.

60 Claims, No Drawings

FOAMED COMPOSITIONS AND METHODS OF USE IN SUBTERRANEAN ZONES

BACKGROUND OF THE INVENTION

The present invention relates to improved well completion methods utilizing foamed cements and foamed well treatment fluids. Additionally, the present invention provides improved foamed cement and foamed well treatment fluids and methods for preparing and using the same.

Foamed hydraulic cement compositions are often utilized in cementing subterranean zones penetrated by well bores. For example, foamed cement compositions are used in primary well cementing operations whereby strings of pipe such as casing and liners are cemented in well bores. A primary cementing operation normally pumps a cement composition into the annular space between the walls of a well bore and the exterior surfaces of a pipe string disposed therein. The cement composition is permitted to set in the annular space thereby forming an annular sheath of hardened substantially impermeable cement therein. Thus, the cement sheath physically supports and positions the pipe string in the well bore and bonds the exterior surfaces of the pipe string to the walls of the well bore. In this manner, the cement precludes the undesirable migration of fluids between zones or formations penetrated by the well bore.

The geological nature of the formation will dictate the type of cement composition appropriate for cementing operations. In order to prevent excessive hydrostatic pressure from unintentionally fracturing the formation, certain formations will require lightweight cement. To achieve the lower density of a lightweight cement, a foamed cement composition contains compressed gas which improves the ability of the cement composition to maintain the pressure necessary to prevent the flow of formation fluid into and through the cement composition during the transition time, i.e., the time during which the cement composition changes from a true fluid to a hard set mass. Foamed cement compositions are also advantageous because they have low fluid loss properties due to the two phases of the system. Therefore, the industry recognizes the benefits of and frequently uses foamed cement and other foamed fluids in sealing casing in subterranean wells.

Although similar to a conventional cementing operation, the process of foaming a cement or wellbore fluid requires additional equipment not commonly associated with conventional cementing operations. Typically, a hydraulic cement composition is foamed by combining a mixture of foaming and foam stabilizing surfactants with the cement composition on the surface. Subsequently, as the cement composition is pumped into the well bore a gas, typically nitrogen, is injected into the cement composition. This process allows the cement composition to have a downhole gas concentration, or foamed quality, of from about 20% to about 80%, by volume of the cement composition depending on the downhole pressure and temperature. This process requires the presence of nitrogen (liquid and/or gas) storage, vaporization, and pumping equipment at the well site. Normally equipment of this nature is not used at well sites and may be unavailable or difficult to transport to remote well sites. Clearly, the use of nitrogen for foaming cement and wellbore fluids complicates and adds to the overall burden of foam cementing a wellbore.

In the designing of the foam cement job, prediction software is utilized to estimate the amount of pressure, if any, required to control the expansion of the foamed fluids. If excessive expansion is encountered, the gas bubbles will become relatively large and coalesce which will increase the permeability of the set cement. To accomplish primary cementing with foam cement, it is desirable to have the wellhead equipped with annular pressure-containing devices. When pressure-containing devices are not feasible, the preferred practice runs an unfoamed cement cap ahead of the foamed cement. The unfoamed "cap" interval should be tailored for each specific job. Typically, an interval of 200-feet is considered the minimum length for the unfoamed cap.

For safety and clean-up ease, the return relief lines are typically staked and chained to exit in an acceptable waste area, such as a sump pit. Foamed cement under pressure will expand in volume prolifically if released at atmospheric pressure. This foam is more of a nuisance than a problem since it develops little strength and can be washed away with a pressure hose.

In view of the problems inherent to foaming with nitrogen, it would be desirable to provide improved foamed cements and foamed well treatment fluids that do not require nitrogen to generate the foamed cement slurry. Further, considering the inherent risks associated with oxygen in the downhole environment, it would be desirable to provide a foamed cement wherein the foaming gas is air having a reduced oxygen content.

SUMMARY OF THE INVENTION

The current invention provides methods and compositions suitable for overcoming the problems identified with current foamed cementing practices. In one aspect, the current invention provides a method of foaming cement with air. The method comprises the steps of preparing a cement composition comprising hydraulic cement, sufficient water to form a slurry, and a mixture of foaming and foam stabilizing surfactants. The method also prepares compressed air with an oxygen content less than an amount necessary to support combustion of hydrocarbons. The compressed air with reduced oxygen content is used to foam the cement composition.

Additionally, the current invention provides a method of foaming cement with air. The improved method comprises the steps of preparing a cement composition comprising hydraulic cement, sufficient water to form a slurry, and a mixture of foaming and foam stabilizing surfactants present in an amount sufficient to facilitate the formation and stabilization of foam. The method also prepares compressed air with an oxygen content less than an amount necessary to support combustion of hydrocarbons by contacting the air with an oxygen scavenger prior to or after compressing the air. In general, the order of compressing the air and contacting the air with an oxygen scavenger is not critical to the current invention and may be reversed such that the oxygen content is lowered by contact with an oxygen scavenger prior to or after compressing the air. The reduced oxygen content air is then used to foam the cement composition.

The current invention further provides an improved method of cementing a well bore penetrating a hydrocarbon producing subterranean zone. The improved method comprises the steps of preparing a cement composition comprising hydraulic cement, sufficient water to form a slurry, and a mixture of foaming and foam stabilizing surfactants. The improved method also prepares compressed air with an oxygen content less than an amount necessary to support combustion of hydrocarbons present in the well bore. The cement composition is foamed with the reduced oxygen content compressed air and placed into the subterranean zone. Following placement of the foamed cement, the cement is allowed to set.

In another embodiment the current invention provides an improved method of cementing a well bore penetrating a hydrocarbon producing subterranean zone. The improved method comprises the steps of preparing a cement composition comprising hydraulic cement, sufficient water to form a slurry, and a mixture of foaming and foam stabilizing surfactants present in an amount sufficient to facilitate the formation and stabilization of foam. The improved method also prepares compressed air with an oxygen content less than an amount necessary to support combustion of hydrocarbons by contacting the air with an oxygen scavenger prior to or after compressing the air. Accordingly, the order of compressing the air and contacting the air with an oxygen scavenger is not critical to the current invention and may be reversed such that the oxygen content is lowered by contact with an oxygen scavenger prior to or after compressing the air. The cement composition is foamed with the reduced oxygen content compressed air and placed into the subterranean zone. Following placement of the foamed cement, the cement is allowed to set into a solid mass.

The current invention also provides an improved foamed cement composition comprising a hydraulic cement, water, and air having an oxygen content less than an amount required to support combustion of hydrocarbons. Typically the water is present in an amount sufficient to form a slurry of the hydraulic cement. Additionally, the foamed cement composition normally comprises from about 20% to about 80% reduced oxygen content air by volume.

In yet another embodiment, the current invention provides a foamed cement composition comprising a hydraulic cement, water; and, air having an oxygen content less than about 12.5% by volume. Typically the water is present in an amount sufficient to form a slurry of the hydraulic cement. Additionally, the foamed cement composition normally comprises from about 20% to about 80% reduced oxygen content air by volume.

DESCRIPTION OF THE PREFERRED EMBODIMENTS

1. Method of Preparing a Reduced Oxygen Content Foamed Cement

One aspect of the current invention provides a method for preparing an improved foamed cement. The steps necessary to prepare a foamed cement are generally well known to those skilled in the art as demonstrated by U.S. Pat. Nos. 6,500,252, 6,227,294, and 6,063,738 all of which are incorporated herein by reference.

The method of the current invention utilizes air with a reduced oxygen content as the gas phase. In the method of the current invention, a cement is prepared according to standard industry procedures. The cement slurry is then foamed using air with an oxygen content lower than that necessary to support combustion of hydrocarbons. Preferably, the oxygen content is less than about 12.5% oxygen. More preferably, the oxygen content is less than about 5% oxygen by volume. The resulting foamed cement is particularly suitable for carrying out primary cementing operations in wells as a result of the cement compositions being lightweight, having low fluid loss, being compressible during the slurry's transition time, and having good thermal insulation properties.

The method of preparing air with lowered oxygen content comprises the steps of contacting the air with an oxygen scavenger and compressing the air with a conventional compressor. In one embodiment, the air contacts or passes through an oxygen scavenger such as sodium thiosulfate available from Calabrian Corp. of Houston, Tex. Other compounds suitable for removing oxygen from air include as sodium sulfite, sodium bi-sulfite, pyrogallic acid, pyrogallol, catechal, sodium erthythrobate, ascorbic acid, amines, resorcinol, quinones, and hydroquinones. As the air contacts the oxygen scavenger, the compound(s) contained therein, absorb or adsorb oxygen from the air. Following oxygen reduction, the air has an oxygen content of less than about 12.5% by volume, preferably, the oxygen content is less than about 5% by volume. Following oxygen reduction the air is compressed using a conventional air compressor. Typically, the compressed air leaves the compressor at a pressure in the range of about 100 KPa to about 14 MPa.

The order of compressing and reducing the oxygen content of the air is not critical to the current invention. Thus, it is within the scope of the current invention to first compress the air and then contact the compressed air with an oxygen scavenger. Either method of preparing the reduced oxygen content compressed air should perform satisfactorily in the current invention.

A variety of hydraulic cements can be utilized in accordance with the present invention including those comprised of calcium, aluminum, silicon, oxygen, and/or sulfur which set and harden by reaction with water. Such hydraulic cements include Portland cements, pozzolanic cements, gypsum cements, high alumina cements, and silica cements. Portland cements or their equivalents are generally preferred for use in accordance with the present invention when performing cementing operations in subterranean zones penetrated by well bores. Portland cements of the types defined and described in API Specification For Materials And Testing For Well Cements, API Specification 10, $5^{th}$ Edition, dated Jul. 1, 1990 of the American Petroleum Institute are particularly suitable. Preferred API Portland cements include classes A, B, C, G and H, with API classes A, G and H being more preferred, and classes G and H being the most preferred.

The water utilized to form the foamed cement compositions of this invention can be fresh water or salt water. The term "salt water" is used herein to mean unsaturated salt solutions and saturated salt solutions including brines and seawater. The water is included in the foamed cement compositions in an amount sufficient to slurry the hydraulic cement. Generally, the water is present in the foamed cement compositions in an amount in the range of from about 30% to about 60% by weight of hydraulic cement therein.

The gas utilized for foaming the cement slurry is the reduced oxygen content air described above. The gas is present in an amount sufficient to foam the slurry, generally in an amount in the range of from about 20% to about 80% by volume of the slurry.

Those skilled in the art are familiar with foaming and foam stabilizing surfactants suitable for use in the downhole environment. A preferred mixture of such surfactants is described in U.S. Pat. No. 5,897,699 issued to Chatterji et al. on Apr. 27, 1999, incorporated herein by reference. The patent discloses an aqueous solution of a mixture of an alpha-olefinic sulfonate and a cocoylamidopropyl betaine.

Another preferred foaming and foam stabilizing surfactant mixture for use in accordance with the present invention is comprised of an ethoxylated alcohol ether sulfate of the formula $H(CH_2)_a(OC_2H_4)_bOSO_3NH_4^+$ wherein "a" is an integer in the range of from about 6 to about 10 and "b" is an integer in the range of from about 3 to about 10, an alkyl or alkene amidopropylbetaine having the formula R'—$CONHCH_2CH_2CH_2N^+(CH_3)_2CH_2CO_2^-$ wherein R is a radical selected from the group of decyl, cocoyl, lauryl, cetyl and oleyl and an alkyl or alkene amidopropyldimethylamineoxide. having the formula R'—$CONHCH_2CH_2CH_2N^+(CH_3)_2O^-$ wherein R' is a radical selected from the group of decyl, cocoyl, lauryl, cetyl and oleyl.

The ethoxylated alcohol ether sulfate is generally present in the above-described mixture in an amount in the range of from about 60 to about 64 parts by weight. The alkyl or alkene amidopropylbetaine is generally present in the mixture in an amount in the range of from about 30 to about 33 parts by weight and the alkyl or alkene amidopropyldimethylamineoxide is generally present in the additive in an amount in the range of from about 3 to about 10 parts by weight.

The most preferred foaming and foam stabilizing surfactant mixture of the type described above for use in accordance with this invention is comprised of an ethoxylated alcohol ether sulfate wherein "a" in the formula set forth above is an integer in the range of from about 6 to about 10 and the ethoxylated alcohol ether sulfate is present in the surfactant mixture in an amount of about 63.3 parts by weight; the alkyl or alkene amidopropyl-betaine is cocoylamidopropylbetaine and is present in the mixture in an amount of about 31.7 parts by weight and the alkyl or alkene amidopropyldimethylamineoxide is cocoylamidopropyldimethylamineoxide and is present in an amount of about 5 parts by weight.

The foaming and foam stabilizing surfactant mixture is generally included in the foamed cement composition of this invention in an amount in the range of from about 0.5% to about 5% by volume of water in the cement slurry, preferably in an amount of from about 1% to about 2.5%.

As will be understood by those skilled in the art, the foamed well cement compositions of this invention can include a variety of conventional additives for improving or changing the properties of the foamed cement compositions. Examples of such additives include, but are not limited to, set retarding agents, fluid loss control agents, set accelerating agents and formation conditioning agents.

Set retarding agents are included in the foamed cement compositions when it is necessary to extend the time in which the foamed cement compositions can be pumped so that they will not set prior to being placed at a desired location in a well. Examples of set retarding agents which can be used include, but are not limited to, lignosulfonates such as calcium and sodium lignosulfonate, organic acids such as tartaric acid and gluconic acid, copolymers of acrylic acid, maleic acid and others. The proper amount of set retarding agent required for particular conditions can be determined by conducting a "thickening time test" for the particular retarder and foamed cement composition. Such tests are described in the API Recommend Practice 10B mentioned above. A suitable set retarder for use in accordance with the present invention is a copolymer or copolymer salt of 2-acrylamido-2-methylpropane sulfonic acid and acrylic acid. The copolymer comprises from about 60 to about 90 mole percent 2-acrylamido-2-methylpropane sulfonic acid with the balance comprising acrylic acid, and the copolymer or salt thereof preferably has an average molecular weight below about 5,000. The most preferred retardant is described in U.S. Pat. No. 6,227,294, which is incorporated herein by reference. When used, a set retarder is included in the foamed cement compositions of this invention in amounts ranging from about 0.1% to about 2% by weight of hydraulic cement in the compositions.

Examples of suitable set accelerating agents include, but are not limited to, calcium chloride, zinc formate and triethanolamine, and examples of formation conditioning agents include, but are not limited to, potassium chloride and sodium chloride.

The foamed cement slurries of this invention may be prepared in accordance with any of the mixing techniques utilized in the art. In one preferred method, a quantity of water is introduced into a cement blender followed by the hydraulic cement utilized. A preferred cement composition suitable for foaming comprises Portland cement and a mixture of foaming and foam stabilizing surfactants. The mixture of foaming and foam stabilizing surfactants being present in the cement composition in an amount ranging from about 1% to about 5% by volume of the water in the composition. The mixture is agitated for a sufficient period of time to form a pumpable non-foamed slurry. Other liquid additives utilized, if any, are preferably added to the water prior to when the hydraulic cement is mixed therewith and other dry solids, if any, are normally added to the water and cement prior to mixing.

Following formation of the non-foamed slurry, the reduced oxygen content air is injected into the slurry to form a foamed cement. As previously noted, the injected air should have an oxygen content of about 12.5% by volume or less. Preferably, the oxygen content is less than about 5% by volume.

2. Method of Cementing With a Reduced Oxygen Content Cement

Cementing operations are carried out in oil and gas wells for a variety of reasons. The most common operations are performed to secure a casing within the well bore and to isolate non-producing or water producing zones from hydrocarbon producing zones. As noted above, cementing processes using foamed cement require additional steps to preclude coalescence of the gas cells within the foamed cement.

When using foamed cement for the primary cementing operation, the wellhead is preferably equipped with an annular pressure-containing device. If a pressure-containing device is unavailable, then an unfoamed cement cap is injected ahead of the foamed cement. The unfoamed cap interval should be tailored for each specific job. Typically, a 200-foot interval is considered the minimum length for the unfoamed cap.

Prior to the current invention, oxygen-containing gases such as air were not suitable for foaming a cement. Due to the presence of hydrocarbons within the well bore, the introduction of air into the wellbore would likely create a combustible gas in the well bore. In general, the possibility of an explosion exists when natural gas and other hydrocarbons associated with petroleum are exposed to an oxygen concentration of greater than about 12.5% by volume. The concentration of oxygen necessary to support combustion will decrease as temperature and pressure increases. Additionally, once the oxygen/hydrocarbon mixture reaches critical mass, the chance of an explosion increases exponentially with increasing pressure. Therefore, to reduce the risk of an uncontrolled downhole explosion, current foaming operations are typically performed with nitrogen. However, as mentioned above, nitrogen injection requires the use of equipment not commonly found at the well bore site.

Accordingly, the current invention provides an improved cementing method wherein foaming operations are carried out by injection of reduced oxygen content air into the desired cement composition. The method of preparing air with lowered oxygen content comprises the steps of contacting the air with an oxygen scavenger and compressing the air with a conventional compressor. In one embodiment, the air contacts or passes through an oxygen scavenger such as sodium thiosulfate available from Calabrian Corp. of Houston, Tex. Other compounds suitable for removing oxygen from air include as sodium sulfite, sodium bi-sulfite, pyrogallic acid, pyrogallol, catechal, sodium erthythrobate, ascorbic acid, amines, resorcinol, quinones, and hydroquinones. As the air contacts the oxygen scavenger, the compound(s) contained therein, absorb or adsorb oxygen from the air. After contacting the oxygen scavenger, the oxygen content of the air has been lowered sufficiently to preclude combustion of hydrocarbons found in the well bore. Preferably, the oxygen content is less than about 12.5% by volume. More preferably, the oxygen content is less than about 5% by volume. As noted above, lowering the oxygen concentration to about 12.5% or less by volume will reducing the likelihood of an uncontrolled explosion in the downhole environment. Following oxygen reduction the air is compressed using a conventional air compressor. Typically, the compressed air leaves the compressor at a pressure in the range of about 100 KPa to about 14 MPa.

As indicated above, the order of compressing and reducing the oxygen content of the air is not critical to the current invention. Thus, it is within the scope of the current invention to first compress the air and then contact the compressed air with an oxygen scavenger. Either method of preparing the reduced oxygen content compressed air should perform satisfactorily in the current invention.

As known to those skilled in the art, oxygen scavengers are compounds capable of absorbing or adsorbing oxygen from air. For example, SPE paper number 28978, "Effects of Oxygen on Fracturing Fluids," by Walker et al., 1995, demonstrates that one mole of sodium thiosulfate is capable of consuming 2 moles of oxygen. Likewise a mole of sodium sulfite is will consume one mole of oxygen. Other commonly used oxygen scavenging compounds include sodium thiosulfate, sodium sulfite, sodium bi-sulfite, pyrogallic acid, pyrogallol, catechal, sodium erthythrobate, ascorbic acid, amines, resorcinol, quinones and hydroquinones. A preferred compound is sodium thiosulfate available from Calabrian Corp. of Houston, Tex.

Following preparation of the reduced oxygen content compressed air, the air is injected into the cement, according to standard operating procedures known to those skilled in the art, at a rate sufficient to produce a foamed cement. One preferred method of cementing with reduced oxygen content foamed cement comprises the steps of: (a) preparing a non-foamed cement slurry comprised of Portland cement, sufficient water to produce a slurry and a mixture of foaming and foam stabilizing surfactants, the mixture being present in the cement composition in an amount ranging from about 1% to about 5% by volume of the water in the composition; (b) preparing reduced oxygen content compressed air having an oxygen content in the compressed air of less than about 12.5% by volume or less; (c) foaming the cement composition by injecting the reduced oxygen air into the cement composition; (d) placing the resulting foamed cement at the desired downhole location; and, (e) allowing the foamed cement composition to set into a solid mass therein. Other liquid additives utilized, if any, are preferably added to the water prior to when the hydraulic cement is mixed therewith and other dry solids, if any, are normally added to the water and cement prior to mixing.

3. Foamed Cement Composition Containing Reduced Oxygen Content Air

The current invention also provides a novel foamed cement composition. The foamed cement composition of the current invention eliminates the need for liquid nitrogen storage or other cryogenic equipment production at the well bore. Briefly stated, the foamed cement composition of the current invention comprises hydraulic cement, sufficient water to produce a slurry, a mixture of foaming and foam stabilizing surfactants and sufficient reduced oxygen content air to foam the slurry. Additionally, as known to those skilled in the art other performance enhancing additives such as, but not limited to, set retarding agents, fluid loss control agents, set accelerating agents and formation conditioning agents may be included in the foamed cement composition.

Preferred cements include Portland cements, pozzolan cements, gypsum cements, high alumina content cements, silica cements and high alkalinity cements. Portland cements or their equivalents are generally preferred for use in accordance with the present invention when performing cementing operations in subterranean zones penetrated by well bores. Portland cements of the types defined and described in API Specification For Materials And Testing For Well Cements, API Specification 10, $5^{th}$ Edition, dated Jul. 1, 1990 of the American Petroleum Institute are particularly suitable. Preferred API Portland cements include classes A, B, C, G and H, with API classes A, G and H being more preferred, and class G and H being the most preferred.

The water in the foamed cement composition may be fresh water or salt water, as defined above. Preferably, the concentration of water in the foamed cement is in the range of about 30% to about 60% by weight of the hydraulic cement therein.

The gas contained within the foamed cement is reduced oxygen content air. Typically, from about 20% to about 80% of the volume of the foamed cement is the reduced oxygen content air. Preferably, from about 20% to about 60% by volume of the foamed cement is the reduced oxygen content air.

Finally, the foaming and foam stabilizing surfactant mixture found in the foamed cement composition generally corresponds to about 0.5% to about 5% by volume of the water found in the cement slurry. More preferably the foaming and foam stabilizing surfactant mixture in the foamed cement composition corresponds to about 1% to about 2.5% by volume of the water found in the cement slurry.

Thus, a particularly preferred foamed cement composition which upon setting has high strength, resiliency, ductility and toughness is comprised of Portland cement, a mixture of foaming and foam stabilizing surfactants, the mixture being present in the cement composition in an amount ranging from about 0.5% to about 5% by volume of the water in the composition, and sufficient water to slurry the cement. Additionally, the preferred foamed cement composition comprises sufficient reduced oxygen content air to foam the slurry. At a minimum, the reduced oxygen content air has an oxygen content lower than an amount necessary to support combustion of hydrocarbons. Preferably, the reduced oxygen content compressed air has less than about 12.5% oxygen by volume. More preferably the reduced oxygen content air contains less than about 5% oxygen by volume. Preferably, the foamed cement composition will comprise from about 20% to about 60% by volume reduced oxygen content air.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

What is claimed is:

1. A method of foaming cement comprising the steps of:
preparing a cement composition comprising hydraulic cement, sufficient water to form a slurry, and a mixture of foaming and foam stabilizing surfactants;
preparing compressed air with an oxygen content less than an amount necessary to support combustion of hydrocarbons; and
foaming the cement composition with the reduced oxygen content compressed air.

2. The method of claim 1 wherein the compressed air has less than about 12.5% oxygen content by volume.

3. The method of claim 1 wherein the compressed air has less than about 5% oxygen content by volume.

4. The method of claim 1 wherein the step of preparing the compressed air comprises contacting the air with an oxygen scavenger prior to or after compressing the air.

5. The method of claim 4 wherein the oxygen scavenger is selected from the group consisting of sodium thiosulfate, sodium sulfite, sodium bi-sulfite, pyrogallic acid, pyrogallol, catechal, sodium erthythrobate, ascorbic acid, amines, resorcinol, quinones and hydroquinones and mixtures thereof.

6. The method of claim 1 wherein the foamed cement composition comprises from about 20% to about 80% reduced oxygen content air by volume.

7. The method of claim 1 wherein the foamed cement composition comprises from about 20% to about 60% reduced oxygen content air by volume.

8. The method of claim 1 wherein the mixture of foaming and foam stabilization surfactants is present in the cement composition in the range of from about 0.5% to about 5% by volume of water in the cement slurry.

9. The method of claim 1 wherein the mixture of foaming and foam stabilization surfactants is present in the cement composition in the range of from about 1% to about 2.5% by volume of water in the cement slurry.

10. The method of claim 1 wherein the mixture of foaming and foam stabilization surfactants comprises an alpha-olefinic sulfonate and a cocoylamidopropyl betaine.

11. The method of claim 1 wherein the mixture of foaming and foam stabilization surfactants comprises an ethoxylated alcohol ether sulfate of the formula $H(CH_2)_a(OC_2H_4)_bOSO_3NH_4^+$ wherein "a" is an integer in the range of from about 6 to about 10 and "b" is an integer in the range of from about 3 to about 10, an alkyl or alkene amidopropylbetaine having the formula $R'—CONHCH_2CH_2CH_2N^+(CH_3)_2CH_2CO_2^-$ wherein R is a radical selected from the group consisting of decyl, cocoyl, lauryl, cetyl and oleyl and an alkyl or alkene amidopropyldimethylamineoxide having the formula $R'—CONHCH_2CH_2CH_2N^+(CH_3)_2O^-$ wherein R' is a radical selected from the group consisting of decyl, cocoyl, lauryl, cetyl and oleyl.

12. The method of claim 11 wherein the ethoxylated alcohol ether sulfate is present in an amount ranging from about 60 to about 64 parts by weight, the alkyl or alkene amidopropylbetaine is present in an amount ranging from about 30 to about 33 parts by weight and the alkyl or alkene amidopropyldimethylamineoxide is present in an amount ranging from about 3 to about 10 parts by weight of the mixture of foaming and foam stabilization surfactants.

13. The method of claim 1 wherein the hydraulic cement is selected from the group consisting of Portland cements, pozzolanic cements, gypsum cements, high alumina cements, and silica cements.

14. The method of claim 1 wherein the hydraulic cement is selected from the group consisting of API Portland cements classes A, B, C, G and H.

15. A method of foaming cement comprising the steps of:
preparing a cement composition comprising hydraulic cement, sufficient water to form a slurry, and a mixture of foaming and foam stabilizing surfactants present in an amount sufficient to facilitate the formation and stabilization of foam;
preparing compressed air with an oxygen content less than about 12.5% oxygen content by volume contacting the air with an oxygen scavenger prior to or after compressing the air; and
foaming the cement composition with the reduced oxygen content compressed air.

16. The method of claim 15 wherein the compressed air has less than 5% oxygen content by volume.

17. The method of claim 15 wherein the oxygen scavenger is selected from the group consisting of sodium thiosulfate, sodium sulfite, sodium bi-sulfite, pyrogallic acid, pyrogallol, catechal, sodium erthythrobate, ascorbic acid, amines, resorcinol, quinones and hydroquinones and mixtures thereof.

18. The method of claim 15 wherein the foamed cement composition comprises from about 20% to about 80% reduced oxygen content air by volume.

19. The method of claim 15 wherein the foamed cement composition comprises from about 20% to about 60% reduced oxygen content air by volume.

20. A method of cementing in a subterranean zone comprising the steps of:
preparing a cement composition comprising hydraulic cement, sufficient water to form a slurry, and a mixture of foaming and foam stabilizing surfactants;
preparing compressed air with an oxygen content less than an amount necessary to support combustion of hydrocarbons present in the subterranean zone;
foaming the cement composition with the reduced oxygen content compressed air;
placing the resulting foamed cement composition into the subterranean zone; and
allowing the foamed cement composition to set therein.

21. The method of claim 20 wherein the compressed air has less than about 12.5% oxygen content by volume.

22. The method of claim 20 wherein the compressed air has less than about 5% oxygen content by volume.

23. The method of claim 20 wherein the step of preparing the compressed air comprises contacting the air with an oxygen scavenger prior to or after compressing the air.

24. The method of claim 23 wherein the oxygen scavenger is selected from the group consisting of sodium thiosulfate, sodium sulfite, sodium bi-sulfite, pyrogallic acid, pyrogallol, catechal, sodium erthythrobate, ascorbic acid, amines, resorcinol, quinones and hydroquinones and mixtures thereof.

25. The method of claim 20 wherein the foamed cement composition comprises from about 20% to about 80% reduced oxygen content air by volume.

26. The method of claim 20 wherein the foamed cement composition comprises from about 20% to about 60% reduced oxygen content air by volume.

27. The method of claim 20 wherein the mixture of foaming and foam stabilization surfactants is present in the cement composition in the range of from about 0.5% to about 5% by volume of water in the cement slurry.

28. The method of claim 20 wherein the mixture of foaming and foam stabilization surfactants is present in the cement composition in the range of from about 1% to about 2.5% by volume of water in the cement slurry.

29. The method of claim 20 wherein the mixture of foaming and foam stabilization surfactants comprises an alpha-olefinic sulfonate and a cocoylamidopropyl betaine.

30. The method of claim 20 wherein the mixture of foaming and foam stabilization surfactants comprises an ethoxylated alcohol ether sulfate of the formula $H(CH_2)_a(OC_2H_4)_bOSO_3NH_4^+$ wherein "a" is an integer in the range of from about 6 to about 10 and "b" is an integer in the range of from about 3 to about 10, an alkyl or alkene amidopropylbetaine having the formula $R—CONHCH_2CH_2CH_2N^+(CH_3)_2CH_2CO_2^-$ wherein R is a radical selected from the group consisting of decyl, cocoyl, lauryl, cetyl and oleyl and an alkyl or alkene amidopropyldimethylamineoxide having the formula $R'—CONHCH_2CH_2CH_2N^+(CH_3)_2O^-$ wherein R' is a radical selected from the group consisting of decyl, cocoyl, lauryl, cetyl and oleyl.

31. The method of claim 30 wherein the ethoxylated alcohol ether sulfate is present in an amount ranging from about 60 to about 64 parts by weight, the alkyl or alkene amidopropylbetaine is present in an amount ranging from about 30 to about 33 parts by weight and the alkyl or alkene amidopropyldimethylamineoxide is present in an amount ranging from about 3 to about 10 parts by weight of the mixture of foaming and foam stabilization surfactants.

32. The method of claim 30 wherein the hydraulic cement is selected from the group consisting of Portland cements, pozzolanic cements, gypsum cements, high alumina cements, and silica cements.

33. The method of claim 30 wherein the hydraulic cement is selected from the group consisting of API Portland cements classes A, B, C, G and H.

34. A method of cementing in a subterranean zone comprising the steps of:

preparing a cement composition comprising hydraulic cement, sufficient water to form a slurry, and a mixture of foaming and foam stabilizing surfactants present in an amount sufficient to facilitate the formation and stabilization of foam;

preparing compressed air with an oxygen content less than about 12.5% oxygen content by volume by contacting the air with an oxygen scavenger prior to or after compressing the air;

foaming the cement composition with the reduced oxygen content compressed air;

placing the resulting foamed cement composition into the subterranean zone; and allowing the foamed cement composition to set therein.

35. The method of claim 34 wherein the compressed air has less than 5% oxygen content by volume.

36. The method of claim 34 wherein the oxygen scavenger is selected from the group consisting of sodium thiosulfate, sodium sulfite, sodium bi-sulfite, pyrogallic acid, pyrogallol, catechal, sodium erthythrobate, ascorbic acid, amines, resorcinol, quinones and hydroquinones and mixtures thereof.

37. The method of claim 34 wherein the foamed cement composition comprises from about 20% to about 80% reduced oxygen content air by volume.

38. The method of claim 34 wherein the foamed cement composition comprises from about 20% to about 60% reduced oxygen content air by volume.

39. A foamed cement comprising:

a hydraulic cement;

water; and air having an oxygen content less than an amount required to support combustion of hydrocarbons.

40. The composition of claim 39 wherein the air has less than 12.5% oxygen content by volume.

41. The composition of claim 39 wherein the air has less than 5% oxygen content by volume.

42. The composition of claim 39 wherein the water is fresh water or salt water and the water comprises from about 30% to about 60% by weight of hydraulic cement.

43. The composition of claim 39 wherein the hydraulic cement is selected from the group consisting of Portland cements, pozzolanic cements, gypsum cements, high alumina cements, and silica cements.

44. The composition of claim 39 wherein the hydraulic cement is selected from the group consisting of API Portland cements classes A, B, C, G and H.

45. The composition of claim 39 wherein the foamed cement composition comprises from about 20% to about 80% reduced oxygen content air by volume.

46. The composition of claim 39 wherein the foamed cement composition comprises from about 20% to about 60% reduced oxygen content air by volume.

47. The composition of claim 39 further comprising a mixture of foaming and foam stabilizing surfactants in an amount sufficient to facilitate formation and stabilization of foam.

48. The composition of claim 39 wherein the mixture of foaming and foam stabilizing surfactants comprises an alpha-olefinic sulfonate and a cocoylamidopropyl betaine.

49. The composition of claim 39 wherein the mixture of foaming and foam stabilizing surfactants comprises an ethoxylated alcohol ether sulfate of the formula $H(CH_2)_a(OC_2H_4)_bOSO_3NH_4^+$ wherein "a" is an integer in the range of from about 6 to about 10 and "b" is an integer in the range of from about 3 to about 10, an alkyl or alkene amidopropylbetaine having the formula $R—CONHCH_2CH_2CH_2N^+(CH_3)_2CH_2CO_2^-$ wherein R is a radical selected from the group consisting of decyl, cocoyl, lauryl, cetyl and oleyl and an alkyl or alkene amidopropyldimethylamineoxide having the formula $R'—CONHCH_2CH_2CH_2N^+(CH_3)_2O^-$ wherein R' is a radical selected from the group consisting of decyl, cocoyl, lauryl, cetyl and oleyl.

50. The composition of claim 49 wherein the ethoxylated alcohol ether sulfate is present in an amount ranging from about 60 to about 64 parts by weight, the alkyl or alkene amidopropylbetaine is present in an amount ranging from about 30 to about 33 parts by weight and the alkyl or alkene amidopropyldimethylamineoxide is present in an amount ranging from about 3 to about 10 parts by weight of the mixture of foaming and foam stabilization surfactants.

51. The composition of claim 47 wherein the mixture of foaming and foam stabilizing surfactants comprises from about 0.5% to about 5% by volume of the water present in the composition.

52. The composition of claim 47 wherein the mixture of foaming and foam stabilizing surfactants comprises from about 1% to about 2.5% by volume of the water present in the composition.

53. A foamed cement comprising:

a hydraulic cement;

water; and air having an oxygen content less than about 12.5% by volume.

54. The composition of claim 53 wherein the air has less than about 5% oxygen content by volume.

55. The composition of claim 53 wherein the water is fresh water or salt water and the water comprises from about 30% to about 60% by weight of hydraulic cement.

56. The composition of claim 53 wherein the hydraulic cement is selected from the group consisting of Portland cements, pozzolanic cements, gypsum cements, high alumina cements, and silica cements.

57. The composition of claim 53 wherein the hydraulic cement is selected from the group consisting of API Portland cements classes A, B, C, G and H.

58. The composition of claim 53 further comprising a mixture of foaming and foam stabilizing surfactants in an amount sufficient to facilitate formation and stabilization of foam.

59. The composition of claim 58 wherein the mixture of foaming and foam stabilizing surfactants comprises from about 1% to about 2.5% by volume of the water present in the composition.

60. The composition of claim 53 wherein the foamed cement composition comprises from about 20% to about 60% reduced oxygen content air by volume.

* * * * *